United States Patent
Holbrook (10) Patent No.: US 10,797,900 B2
(45) Date of Patent: Oct. 6, 2020

(54) SYSTEM AND METHOD OF FILTERING CONTROL PLANE DATA

(71) Applicant: Arista Networks, Inc., Santa Clara, CA (US)

(72) Inventor: Hugh W. Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/863,730

(22) Filed: Jan. 5, 2018

(65) Prior Publication Data

US 2019/0215170 A1 Jul. 11, 2019

(51) Int. Cl.
*H04L 12/18* (2006.01)
*H04L 12/761* (2013.01)
*H04L 12/721* (2013.01)

(52) U.S. Cl.
CPC ............ *H04L 12/185* (2013.01); *H04L 45/16* (2013.01); *H04L 45/34* (2013.01)

(58) Field of Classification Search
None
See application file for complete search history.

(56) References Cited

U.S. PATENT DOCUMENTS

2009/0310609 A1* 12/2009 Fernandez Gutierrez ................... H04L 12/185 370/390
2014/0036916 A1* 2/2014 Fernandez Gutierrez ................... H04L 12/185 370/390

* cited by examiner

*Primary Examiner* — Chi H Pham
*Assistant Examiner* — Raul Rivas
(74) *Attorney, Agent, or Firm* — Haley Guiliano LLP (57) ABSTRACT

A method and apparatus of a network element that converts an indication from a multicast routing protocol is described. In an exemplary embodiment, the network element receives a multicast routing protocol indication for a multicast group, wherein the multicast group is configured for a set of one or more sources. The network element additionally converts the indication to a set of one or more source specific routing protocol messages. Furthermore, the network element determines a set of one or more network elements for the set of one or more source specific routing protocol messages and sends the set of one or more source specific routing protocol messages to the set of one or more network elements.

20 Claims, 9 Drawing Sheets

SYSTEM AND METHOD OF FILTERING CONTROL PLANE DATA

FIELD OF INVENTION

This invention relates generally to data networking, and more particularly, to converting a multicast routing protocol general request to a multicast routing protocol source specific request.

BACKGROUND OF THE INVENTION

Multicast is a group communication mechanism where multicast data is forwarded from a multicast source to one or more multicast receivers. Multicast can be used to distribute data to one or more multicast receiver, such as audio-visual data, financial data, and/or other types of information. A receiver that wishes to join the multicast group G sends a message to the routers adjacent to the receiver, such as an Internet Group Management Protocol (IGMP) message, that is used to communicate membership information for this group (e.g., join or drop membership for a multicast group). This router receives this message and sends a join message (if the IGMP message is a join) or a prune message (if the IGMP message is a leave) to the rendezvous point for the multicast group G. The join or prune message can be a Protocol Independent Multicast (PIM) join or prune message.

In addition, a rendezvous point (RP) for the multicast group is used that is a network element that controls the membership for the multicast group G. Each network element along the path toward the RP builds a wild card (any-source) state for the group and sends Join/Prune messages on toward the RP. In one embodiment, a wild card state for a group means that any source can send multicast data to the receiver and the multicast data is forwarded along a path via the RP.

If receiver joins the multicast group G, the flow of data from a multicast source for this group flows from the source node to the corresponding first hop router for this source, along the any intervening network elements to the RP for the multicast group G and then to the receiver. A problem can occur where the shortest path between the receiver and the source may not go through the RP.

SUMMARY OF THE DESCRIPTION

A method and apparatus of a network element that converts an indication from a multicast routing protocol is described. In an exemplary embodiment, the network element receives a multicast routing protocol indication for a multicast group, wherein the multicast group is configured for a set of one or more sources. The network element additionally converts the indication to a set of one or more source specific routing protocol messages. Furthermore, the network element determines a set of one or more network elements for the set of one or more source specific routing protocol messages and sends the set of one or more source specific routing protocol messages to the set of one or more network elements.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

A method and apparatus of a network element that converts a multicast routing protocol message is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that converts a multicast routing protocol message is described. In one embodiment, the network element is configured with configuration data for a multicast group G. In this embodiment, the configuration data can include the Internet Protocol (IP) address for each of the multicast sources of the multicast group G. In addition, this network element is a network element for a receiver that can join or leave the multicast group G. The receiver can send a message that indicates that the receiver wishes either join or leave the multicast group G, such as an IGMP message.

In one embodiment, the network element receives this message from the receiver and uses that as an indication that the network element can send a source specific multicast routing protocol message. In this embodiment, instead of (or in addition to) sending a wild card multicast routing protocol message (e.g., a (*, G) Protocol Independent Multicast (PIM) message), the network element generates a set of source specific multicast routing protocol messages that are sent to the corresponding sources. In one embodiment, the network element sends a (S, G) multicast message towards the corresponding source. By sending the (S, G) multicast message to the corresponding source, each network element along the path to the designated router for this source updates a (S, G) state for this receiver. In one embodiment, the (S, G) multicast messages can either be (S, G) join or a (S, G) prune. A (S, G) join message indicates that the receiver wishes to join the multicast group G, and the network elements along the path to the receiver from the source will forward the multicast group G data to the receiver. Alternatively, a (S, G) prune message indicates that the receiver does not wish to be part of the multicast group G, and the network elements along the path to the source prune the receiver from the multicast state for this multicast group G that is maintained in the network element(s) on the path.

Figure 1:
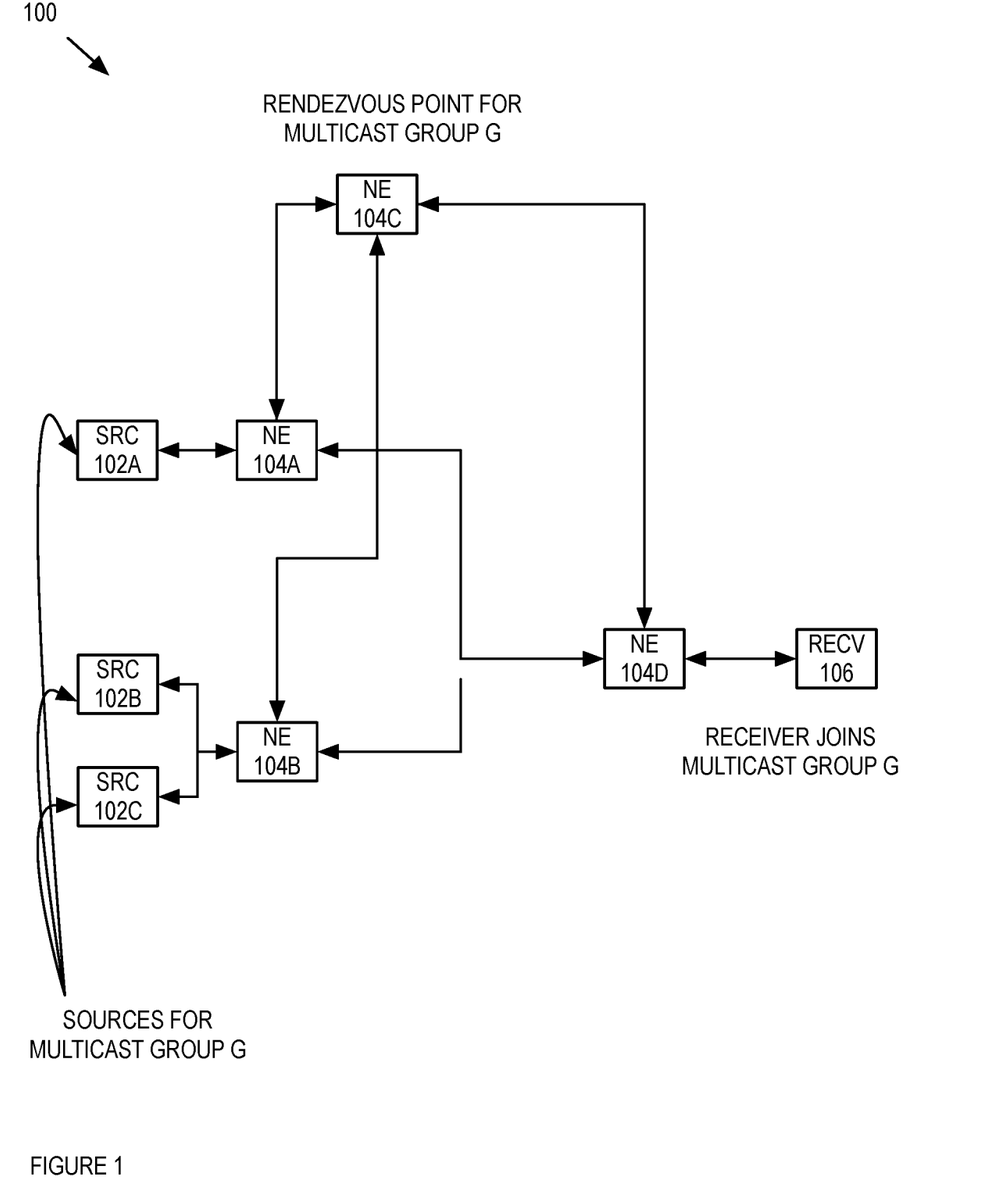
FIG. 1 is a block diagram of one embodiment of a system of network elements and other devices that participate in a multicast group G.

FIG. 1 is a block diagram of one embodiment of a system 100 of network elements 104A-D and other devices 102A-C and 106 that participate in a multicast group G. In FIG. 1, each of the network element 104A-D can each be a switch, router, hub, bridge, gateway, etc., or any type of device that can communicate multicast data packets with a network. In one embodiment, each of the network elements 104A-D can be a virtual machine. In addition, each of the sources 102A-C are multicast content sources for the multicast group G. In one embodiment, each of the sources 102A-C transmits the multicast content using the multicast address for the multicast group G. In one embodiment, the multicast content can be video, audio, financial, enterprise, and/or other types of multicast content. In one embodiment, each of the sources 102A-C are coupled to a corresponding network element 104A-B. In one embodiment, the corresponding network element 104A-B is a next hop network element for one of the sources 102A-C. In another embodiment, the network elements 104A-B are designated routers for a corresponding one of the sources 102A-C.

In one embodiment, a receiver 106 wishes to join the multicast group G by sending a message to a network element 104D that is coupled to the receiver 106. In one embodiment, the receiver 106 can be a personal computer, laptop, server, mobile device (e.g., smartphone, laptop, personal digital assistant, music playing device, gaming device, etc.), and/or any type of device capable of compressing an object in memory. In one embodiment, the receiver 106 can be a physical or virtual device. In this embodiment, the message sent from receiver 106 can be an Internet Group Management Protocol (IGMP) message that is used to communicate membership information (e.g., join or drop membership for a multicast group). The network element 104D receives this message and is the designated router for this receiver and this multicast group G. In addition, the network element 104D sends a join message (if the IGMP message is a join) or a prune message (if the IGMP message is a leave) to the rendezvous point for the multicast group G. In one embodiment, the join or prune message is a Protocol Independent Multicast (PIM) join or prune message.

In one embodiment, a rendezvous point (RP) for a multicast group is the network element that controls the membership for the multicast group G. Each network element along the path toward the RP builds a wild card (any-source) state for the group and sends Join/Prune messages on toward the RP. In one embodiment, a wild card state for a group means that any source can send multicast data to the receiver and the multicast data is forwarded along a path via the RP.

In one embodiment, a problem with this arrangement is that if receiver 106 joins the multicast group G, is that the data from the multicast source for this group flows from the source node (e.g., one or more of source 102A-C) to the corresponding designated router for this source (e.g., network element 104A for source 102A or network element 104B for sources 102B-C), along the any intervening network elements to the RP for the multicast group G, network element 104C. In this embodiment, the problem is that the shortest path between the designated routers for the receiver 106 (e.g., network element 104D) and one or more of the sources (e.g., network elements 104A-B) may not go through the RP (e.g., network element 104C). For example and in one embodiment, as illustrated in FIG. 1, the shortest path between the designated routers for the receiver 106 (e.g., network element 104D) and sources 102A-C (e.g., network element 104A-B) do not go through network element 104C, because network element 104D is one hop away from network elements 104A-B, where a path from network element 104D to network elements 104A-B through network element 104C involves two hops. While in one embodiment, the shortest path between network element 104D and network elements 104A-B is illustrated as a one hop path and the path between network element 104D and network elements 104A-B is illustrated as a two hop path, in alternate embodiments, the shortest path between these designated routers and the path between the designated routers can be more than one or two hops, respectively.

In one embodiment, in order to have the multicast data flow on the shortest path between the designated router of the source to the designated router of the receiver and possibly not through the RP for the multicast group G, the designated router of the receiver converts a join/prune message that would be sent to the RP of the multicast group G into a source specific multicast routing protocol message that is forwarded toward a designated router of the source along the shortest path between these pairs of these designated router(s) (e.g., network elements 104A & D and network elements 104B & D). By using the source specific multicast routing protocol message, the designated router for the source uses the forwarding information of this designated router to send the multicast data along the shortest path between the designated router of receiver and the designated router of the source. In addition, intervening network elements along this shortest path between the designated router of the receiver and the designated router of the source processes the source specific multicast routing protocol message so as to configure the forwarding information base of this network element to forward (in the case of a join message) or not forward (in the case of a prune message) multicast data from the source to the receiver. In addition, this designated router will update its multicast state tables for the source and receiver for this multicast group.

Figure 2:
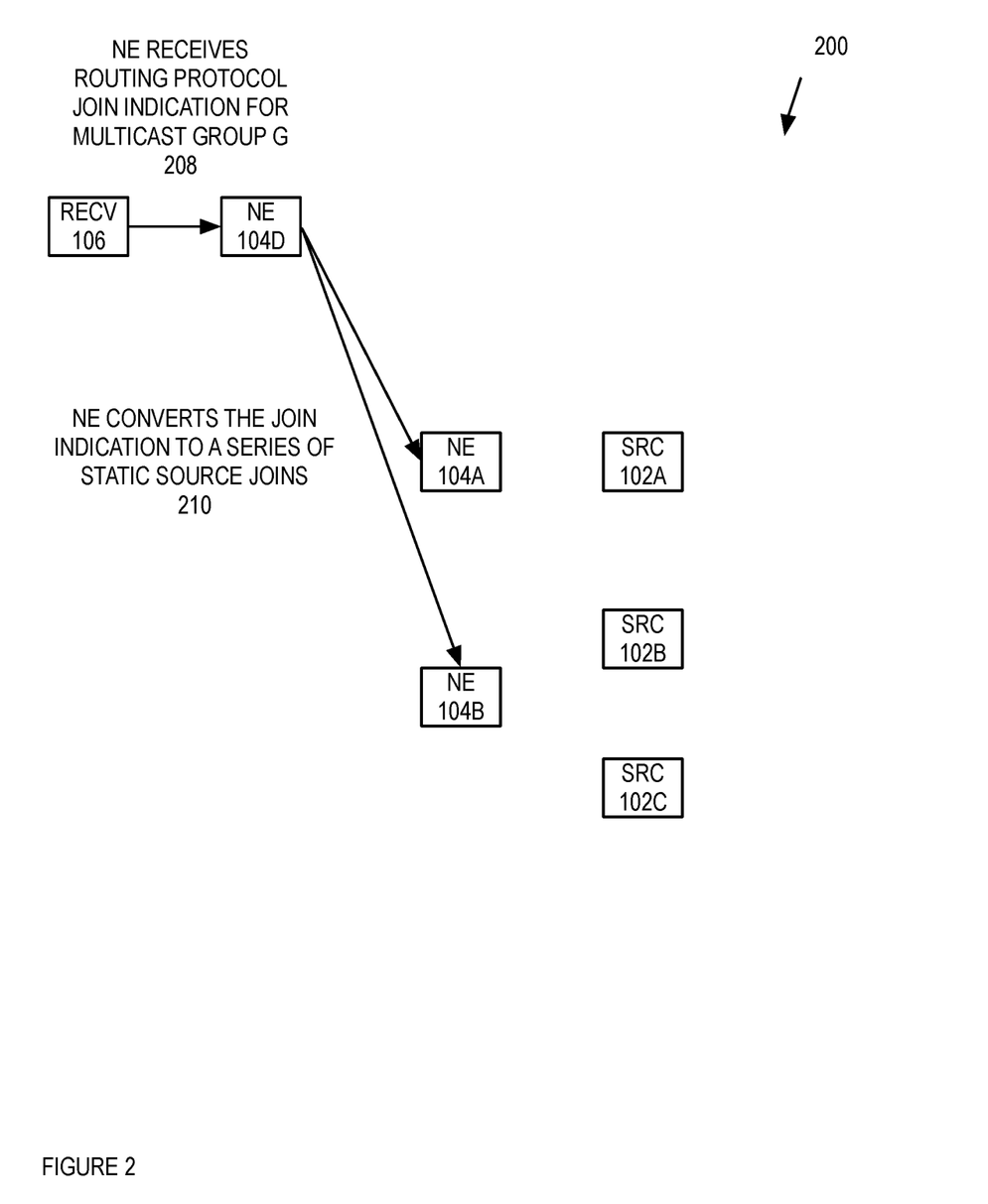
FIG. 2 is a block diagram of one embodiment of a system of network elements and other devices that converts an indication from a multicast routing protocol to a source specific multicast routing protocol message.

FIG. 2 is a block diagram of one embodiment of a system of network elements and other devices that converts an indication from a multicast routing protocol to a source specific multicast routing protocol message. In FIG. 2, the receiver 106 sends an IGMP message (or another type of multicast membership protocol message, such as Multicast Listener Discovery protocol message) that is used to communicate membership information. In one embodiment, the IGMP message can either be a join message, indicating that the receiver 106 wishes the join the multicast group G, or can be a leave message, indicating that the receiver 106 wishes to leave the multicast group G. The network 104D receives this IGMP messages and, in response, would normally send a PIM Join/Prune message to the rendezvous point of this multicast group G (network element 104C). However, in one embodiment, the network element 104D is configured with the sources for this multicast group G. For example and in one embodiment, the Internet Protocol (IP) addresses for the source(s) are well-known and configured for network element 104D, so that network element 104D can determine a next hop for the IP address(es) for a source specific multicast routing protocol message. In one embodiment, the IP address(es) for the source(s) are unicast address(es).

In one embodiment, the network element 104D sends a source specific multicast routing protocol messages to the each of the sources for the multicast group G. In this embodiment, the network element 104D sends a source specific multicast routing protocol message to each of the known sources for the multicast group G. In one embodiment, the network element 104D sends a (S, G) multicast message to the corresponding source (210). By sending the (S, G) multicast message to the corresponding source, each network element along the path to the designated router for this source builds a (S, G) state for this receiver. This causes the multicast traffic for multicast group G to flow to receiver 106 by the shortest path between the network elements for the sources 102A-C and receiver 106 (e.g., network elements 104A-B and network element 104D). In one embodiment, the (S, G) multicast messages can either be (S, G) join or a (S, G) prune. A (S, G) join message indicates that the receiver 106 wishes to join the multicast group G, and the network elements along the path to the receiver from the source will forward the multicast group G data to the receiver 106. Alternatively, a (S, G) prune message indicates that the receiver 106 does not be part of the multicast group G, and the network elements along the path to the prune the receiver 106 from the multicast state for this multicast group G that in maintained that network element on the path.

Figure 3:
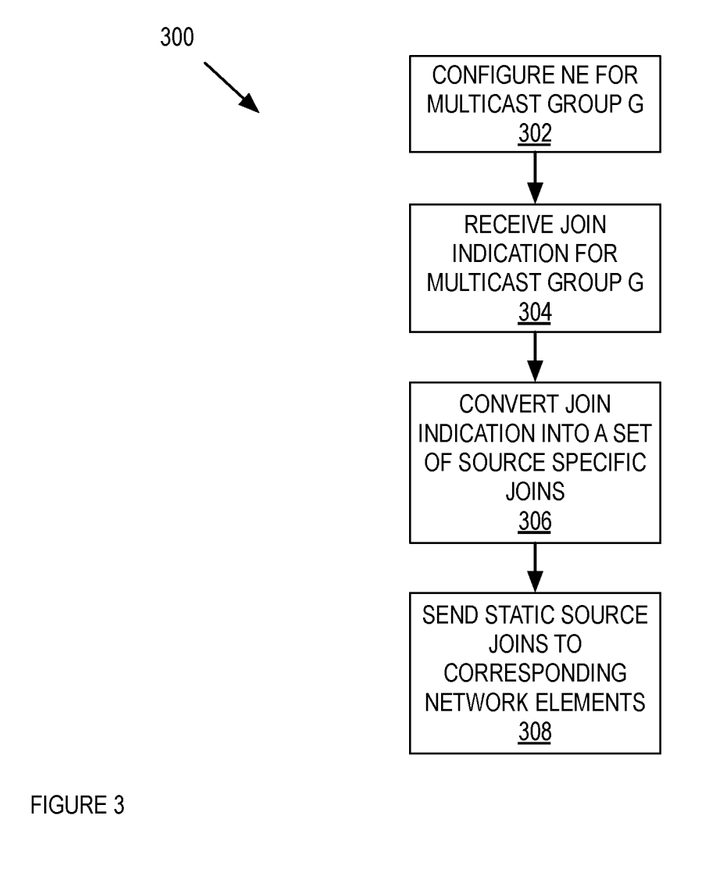
FIG. 3 is flow diagram of one embodiment of a process to convert a join indication from a multicast routing protocol to a source specific multicast routing protocol join message.

FIG. 3 is flow diagram of one embodiment of a process 300 to convert a join indication to a source specific multicast routing protocol join message. In one embodiment, a router for a receiver converts a join indication from multicast routing protocol to a source specific multicast routing protocol join message, such as the network element 104D as described in FIG. 1 above. In FIG. 3, process 300 begins by configuring the network element for the multicast group G. In one embodiment, process 300 configures the network element by receiving configurational data about the sources at block 302. In this embodiment, a source for a multicast group G is a device that sends multicast data to multicast group G, which is then forwarded to members of this multicast group. In one embodiment, the configurational data can be the IP addresses for the sources. At block 304, process 300 receives a join indication from a multicast protocol. In one embodiment, the join indication is derived from a multicast membership protocol join message (e.g., an IGMP join message).

Process 300 converts the join indication into a set of source specific multicast routing protocol messages at block 306. In one embodiment, process 300 uses the source configuration data to generate the source specific multicast routing protocol join messages. For example and in one embodiment, process 300 uses the IP addresses for each of the sources in the multicast group to generate a separate source specific multicast routing protocol join message for each source. In this example, if the network element is configured to have IP addresses for three different sources, process 300 created three different source specific multicast routing protocol join messages using the IP addresses for each of the sources. In one embodiment, each source specific multicast routing protocol join message is a PIM (S, G) join message. At block 308, process 300 sends the source specific multicast routing protocol messages to each of the sources. By sending the source specific multicast routing protocol messages, a shortest path for the multicast data can be created between the receiver and the source(s) without having to go through the rendezvous point for the multicast group. In addition, network element(s) along the path to the designated router for this source builds a (S, G) state for this receiver.

Figure 4:
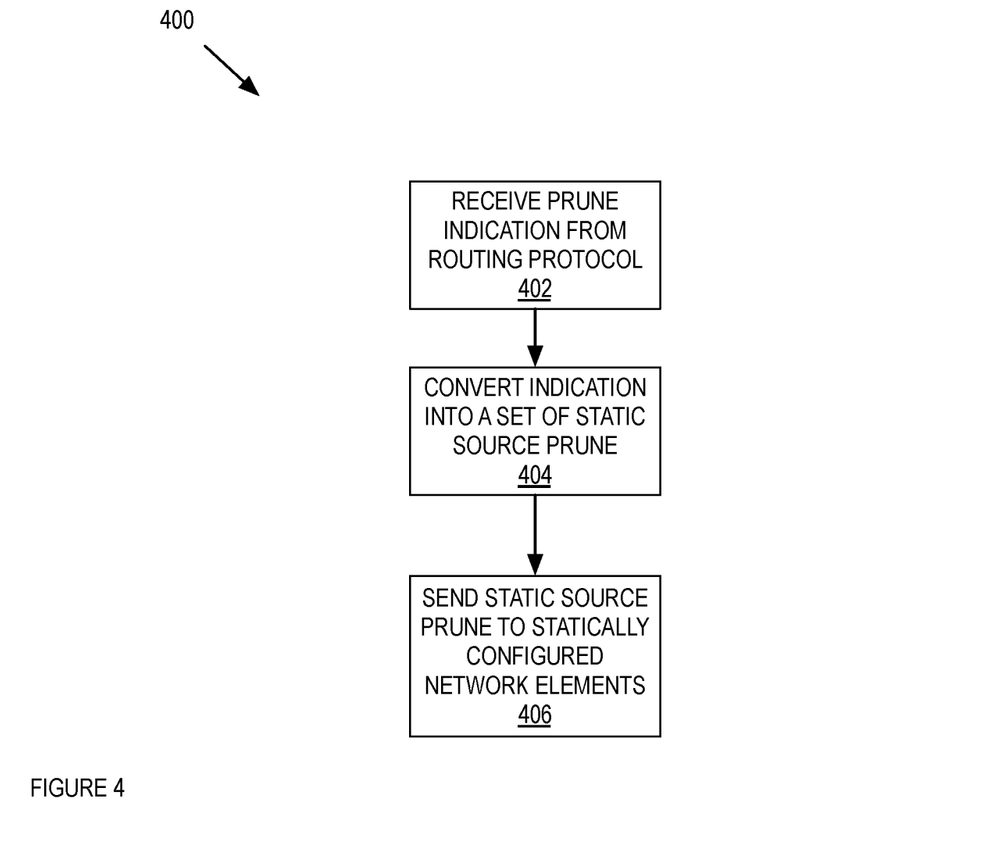
FIG. 4 is flow diagram of one embodiment of a process to convert a prune indication from a multicast routing protocol to a source specific multicast routing protocol prune message.

In addition to joining a multicast group, a receiver may wish to leave a multicast group. FIG. 4 is flow diagram of one embodiment of a process 400 to convert a prune indication from a multicast routing protocol to a source specific multicast routing protocol prune message. In one embodiment, a network element for a receiver converts an indication of a multicast routing protocol prune to a source specific multicast routing protocol prune message, such as the network element 104D as described in FIG. 1 above. In FIG. 4, process 400 begins by receiving a prune indication from the multicast membership protocol. In one embodiment, process 400 determines that there are no other receivers for this multicast group from the network element that executes process 400. Process 400 converts the prune indication into a set of source specific multicast routing protocol prune messages at block 404. In one embodiment, process 400 uses the source configuration data to generate the source specific multicast routing protocol prune messages. For example and in one embodiment, process 400 uses the IP addresses for each of the sources in the multicast group to generate a separate source specific multicast routing protocol prune message for each source. In this example, if the network element is configured to have IP addresses for three different sources, process 400 created three different source specific multicast routing protocol prune messages using the IP addresses for each of the sources. In one embodiment, each source specific multicast routing protocol prune message is a PIM (S, G) prune message. At block 406, process 400 sends the source specific multicast routing protocol prune messages to each of the sources. By sending the source specific multicast routing protocol prune messages, each network element along the path to the designated router for this source prunes the (S, G) state for this receiver from the multicast state maintained by that network element for this receiver.

Figure 5:
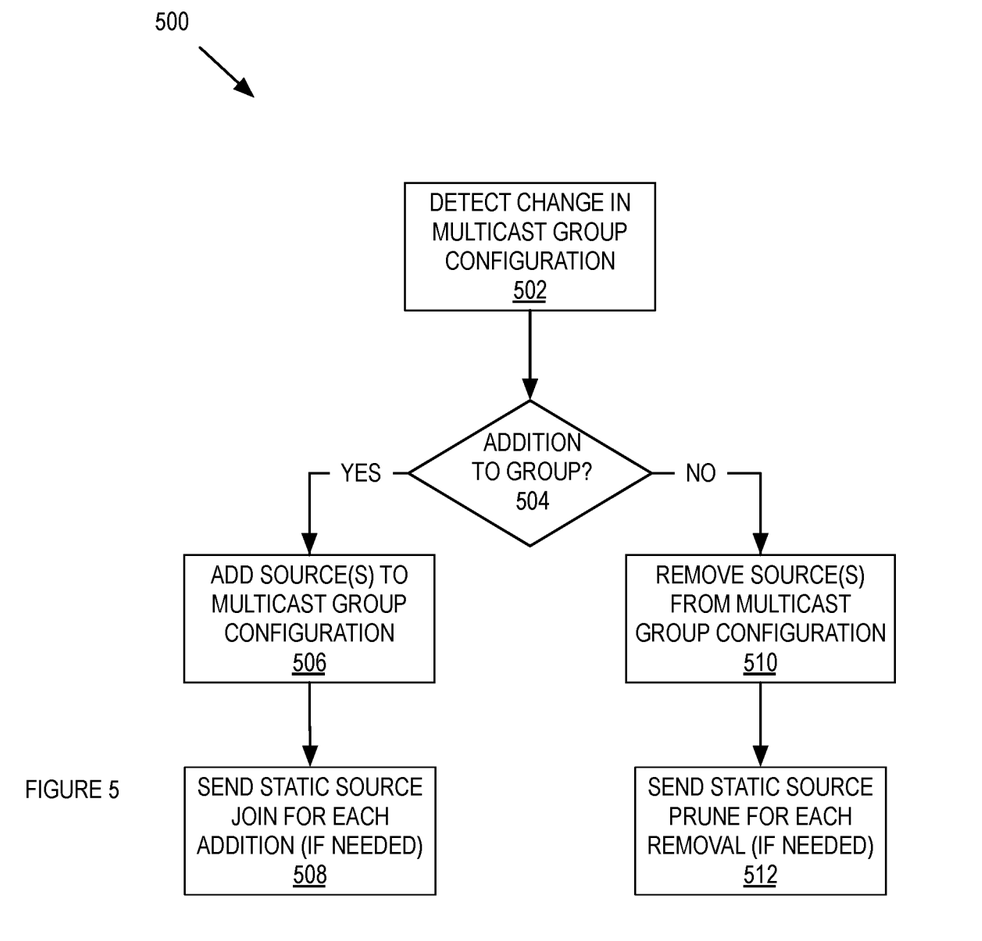
FIG. 5 is flow diagram of one embodiment of a process to handle a change in a source group membership for a multicast group G.

In one embodiment, the sources in a multicast group G can change. For example and in one embodiment, a new source can be added to the multicast group or an existing source can be removed. FIG. 5 is flow diagram of one embodiment of a process to handle a change in a source group membership for a multicast group G. In one embodiment, a network element for a receiver handles a change in a source group membership for a multicast group G, such as the network element 104D as described in FIG. 1 above. In FIG. 5, process 500 begins by detecting a change in a multicast group configuration at block 502. In one embodiment, process 500 can detect a change in the multicast group configuration by receiving a change in the multicast group configuration from a management command (e.g., a command from a command line interface (CLI), network management station, and/or another type of management tool). At block 504, process 500 determines if the change is an addition of a source to the multicast group G. If the change in a source addition to the multicast group G, process 500 adds the source to the multicast group configuration at block 508. In one embodiment, process 500 adds the source to the multicast group configuration by adding the IP address of the new source to the multicast group configuration. At block 506, process 500 sends a source specific multicast routing protocol join message for the new source added to the multicast group G. In one embodiment, the source specific multicast routing protocol join message is a PIM (S, G) join message.

If the change in the multicast group configuration is not an addition of a source, in one embodiment, the change can be a removal of a source from the multicast group configuration. At block 510, process 500 removes the source from the multicast group configuration for the multicast group G. In one embodiment, removes the source from the multicast group G by deleting the IP for this source from the multicast group configuration. Process 500 sends a source specific multicast routing protocol prune message to the network element for this deleted source. In one embodiment, the source specific multicast routing protocol prune message is a PIM (S, G) prune message. By sending the source specific multicast routing protocol prune messages, each network element along the path to the network element for this source prunes the (S, G) state for this receiver from the multicast state maintained by that network element for this receiver.

Figure 6A:
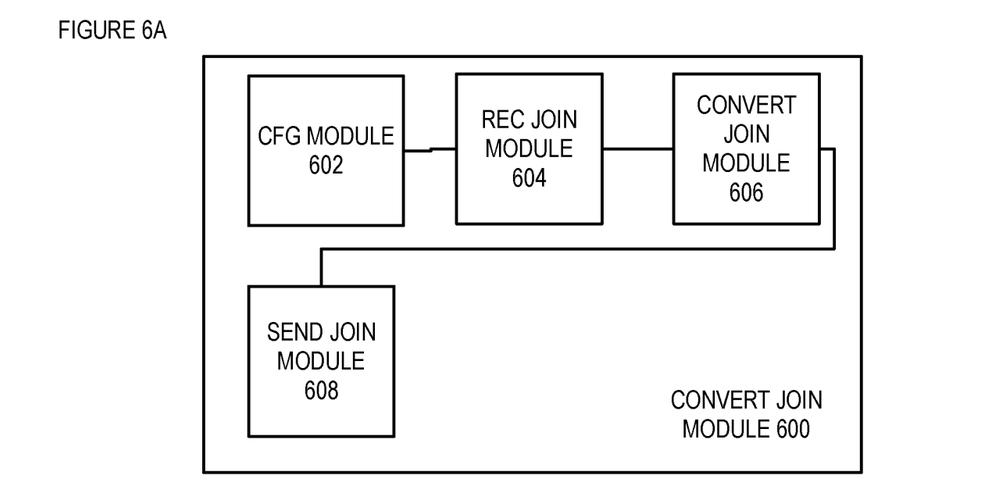
FIG. 6A is a block diagram of one embodiment of a convert join module that converts a join indication from a multicast routing protocol to a source specific multicast routing protocol join message.

FIG. 6A is a block diagram of one embodiment of a convert join module 600 that converts a join indication from a multicast routing protocol to a source specific multicast routing protocol join message. In one embodiment, the convert join module 600 includes a configure module 602, receive join module 604, convert join module 606, and send join module 608. In one embodiment, the configure module 602 configures the network element for multicast group G as described in FIG. 3, block 302 above. The receive join module 604 receives the join indication as described in FIG. 3, block 304 above. The convert join module 606 converts the received join indication to a source specific multicast routing protocol join message as described in FIG. 3, block 306 above. The send join module 608 sends the source specific multicast routing protocol join message as described in FIG. 3, block 308 above.

Figure 6B:
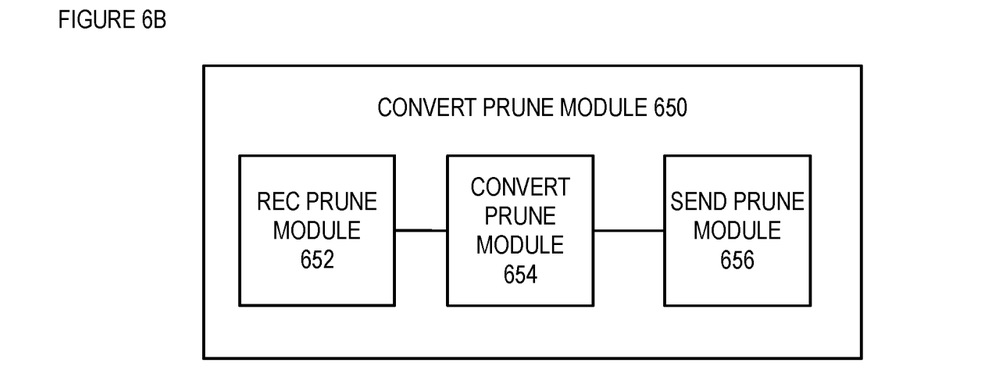
FIG. 6B is a block diagram of one embodiment of a convert prune module that converts a prune indication from a multicast routing protocol to a source specific multicast routing protocol prune message.

FIG. 6B is a block diagram of one embodiment of a convert prune module 650 that converts a prune indication from a multicast routing protocol to a source specific multicast routing protocol prune message. In one embodiment, the convert prune module 650 includes a receive prune module 652, convert prune module 654, and send prune module 656. In one embodiment, the receive prune module 652 receives a prune indication as described in FIG. 4, block 402 above. The convert prune module 654 converts the prune indication as described in FIG. 4, block 404 above. The send prune module 656 sends static source prune message(s) as described in FIG. 4, block 406 above.

Figure 7:
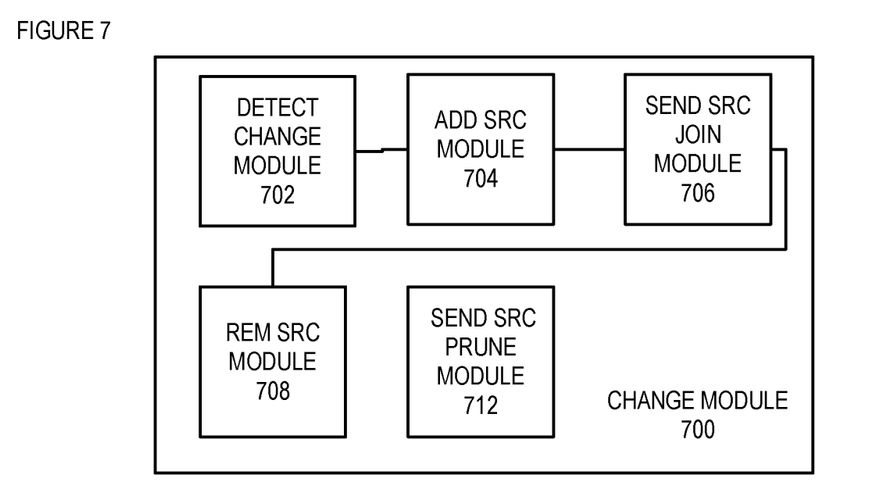
FIG. 7 is a block diagram of one embodiment of a change module that handles a change in a source group membership for a multicast group G.

FIG. 7 is a block diagram of one embodiment of a change module 700 that handles a change in a source group membership for a multicast group G. In one embodiment, the change module 700 includes a detect change module 702, add source module 704, send source join module 706, remove source module 708, and send source prune module 710. In one embodiment, the detect change module 702, add source module 704, send source join module 706, remove source module 708, and send source prune module 710. In one embodiment, the detect change module 702 detects a change in the multicast group configuration as described in FIG. 7, block 502 above. The add source module 704, adds a source as described in FIG. 7, block 506 above. The send source join module sends the source specific multicast routing protocol join message as described in FIG. 7, block 508 above. The remove source module 708 removes the source from the multicast group configuration as described in FIG. 7, block 510 above. The send source prune module 710 sends the sends the source specific multicast routing protocol prune message as described in FIG. 7, block 512 above.

Figure 8:
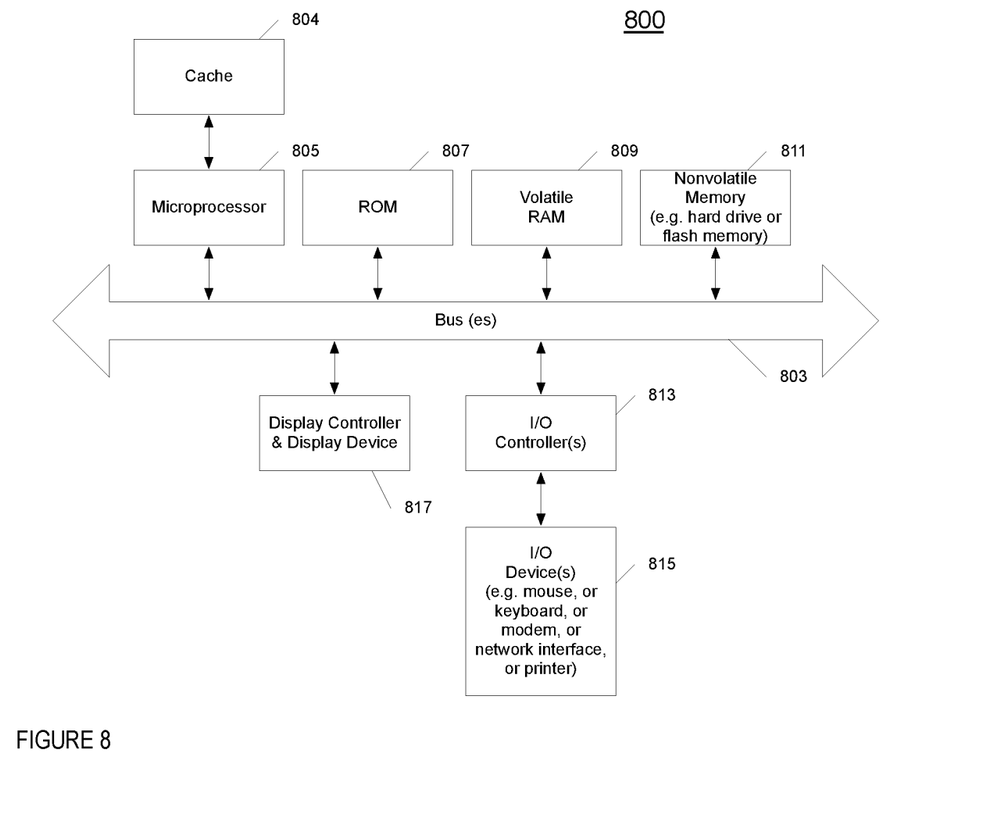
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented including a network element 104D as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output (I/O) devices which may be mice, keyboards, modems, network interfaces, printers and other devices which are well known in the art. In one embodiment, the system 800 includes a plurality of network interfaces of the same or different type (e.g., Ethernet copper interface, Ethernet fiber interfaces, wireless, and/or other types of network interfaces). In this embodiment, the system 800 can include a forwarding engine to forward network date received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 9:
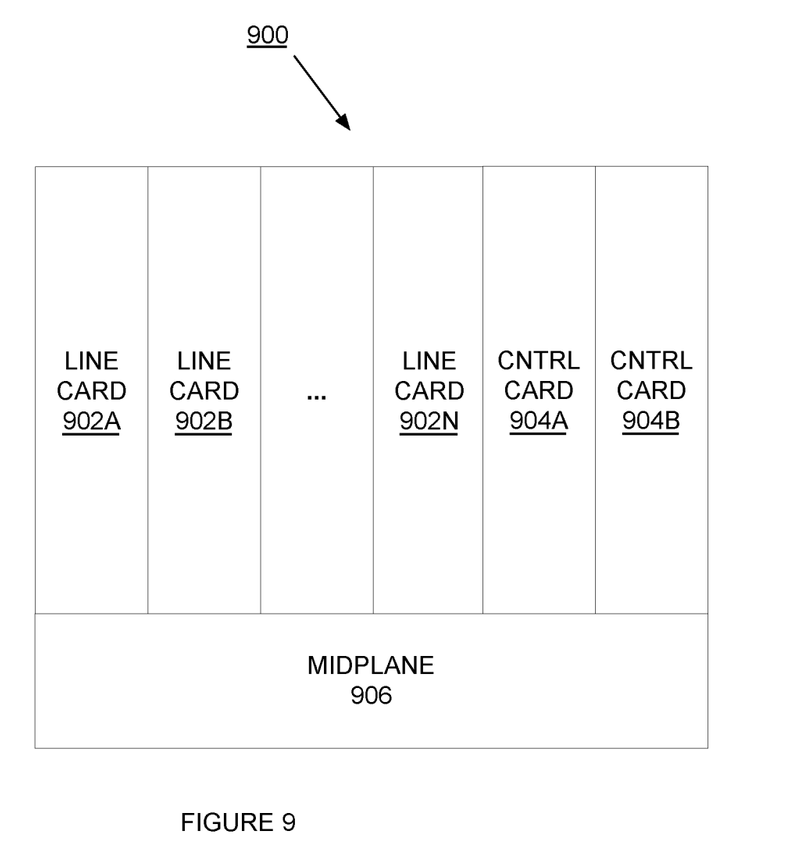
FIG. 9 is a block diagram of one embodiment of an exemplary network element that converts a multicast routing protocol general message to a source specific multicast routing protocol message in a network element.

FIG. 9 is a block diagram of one embodiment of an exemplary network element 900 that converts an indication of a multicast routing protocol general message to a source specific multicast routing protocol message. In FIG. 9, the midplane 906 couples to the line cards 902A-N and controller cards 904A-B. While in one embodiment, the controller cards 904A-B control the processing of the traffic by the line cards 902A-N, in alternate embodiments, the controller cards 904A-B, perform the same and/or different functions (e.g., converting an indication of a multicast routing protocol general message to a source specific multicast routing protocol message as described in FIGS. 3-5 above). In one embodiment, the line cards 902A-N processes network data. It should be understood that the architecture of the network element 900 illustrated in FIG. 9 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "converting," "determining," "selecting," "sending," "processing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to convert an indication from a multicast routing protocol, the method comprising:
receiving, at a network element, a multicast routing protocol indication for a multicast group, wherein the multicast group is configured for a set of one or more sources, wherein the one or more sources are not rendezvous points;
converting the indication to a set of one or more source specific routing protocol messages, wherein the converting is not dependent upon any prior protocol message being sent to rendezvous points;
determining a set of one or more network elements for the set of one or more source specific routing protocol messages; and
sending the set of one or more source specific routing protocol messages towards the one or more sources to the set of one or more network elements, wherein the set of one or more source specific routing protocol messages are sent independent of rendezvous points and along a shortest path to the one or more sources.

2. The machine-readable medium of claim 1, wherein the indication is selected from the group consisting of a multicast routing protocol join indication and a multicast routing protocol prune indication.

3. The machine-readable medium of claim 1, wherein the multicast routing protocol indication is a multicast routing protocol join indication and each of the set of one or more source specific routing protocol messages are each a source specific routing protocol join messages.

4. The machine-readable medium of claim 1, wherein the multicast routing protocol indication is a multicast routing protocol prune indication and each of the set of one or more source specific routing protocol messages are each a source specific routing protocol prune messages.

5. The machine-readable medium of claim 1, wherein each of the set of one or more sources provides content for the multicast group.

6. The machine-readable medium of claim 1, wherein the multicast routing protocol indication is generated in response to a multicast message received from another network element coupled to the receiving network element.

7. The machine-readable medium of claim 1, wherein the multicast protocol is a Protocol Independent Multicast protocol.

8. A method to convert an indication from a multicast routing protocol, the method comprising:
receiving, at a network element, a multicast routing protocol indication for a multicast group, wherein the multicast group is configured for a set of one or more sources, wherein the one or more sources are not rendezvous points;
converting the indication to a set of one or more source specific routing protocol messages, wherein the converting is not dependent upon any prior protocol message being sent to rendezvous points;
determining a set of one or more network elements for the set of one or more source specific routing protocol messages; and
sending the set of one or more source specific routing protocol messages towards the one or more sources to the set of one or more network elements, wherein the set of one or more source specific routing protocol messages are sent independent of rendezvous points and along a shortest path to the one or more sources.

9. The method of claim 8, wherein the indication is selected from the group consisting of a multicast routing protocol join indication and a multicast routing protocol prune indication.

10. The method of claim 8, wherein the multicast routing protocol indication is a multicast routing protocol join indication and each of the set of one or more source specific routing protocol messages are each a source specific routing protocol join messages.

11. The method of claim 8, wherein the multicast routing protocol indication is a multicast routing protocol prune indication and each of the set of one or more source specific routing protocol messages are each a source specific routing protocol prune messages.

12. The method of claim 8, wherein each of the set of one or more sources provides content for the multicast group.

13. The method of claim 8, wherein the multicast routing protocol indication is generated in response to a multicast message received from another network element coupled to the receiving network element.

14. The method of claim 8, wherein the multicast routing protocol is a Protocol Independent Multicast protocol.

15. A network element that converts an indication from a multicast routing protocol, the network element comprising:
at least one processor;
a memory coupled to the at least one processor though a bus; and
a process executed from the memory by the at least one processor that causes the at least one processor to receive a multicast routing protocol indication for a multicast group, wherein the multicast group is configured for a set of one or more sources and the one or more sources are not rendezvous points, convert the indication to a set of one more source specific routing protocol messages, wherein the convert is not dependent upon any prior protocol message being sent to rendezvous points, determine a set of one or more network elements for the set of one or more source specific routing protocol messages, and send the set of one or more source specific routing protocol messages towards the one or more sources to the set of one or more network elements, wherein the set of one or more source specific routing protocol messages are sent independent of rendezvous points and along a shortest path to the one or more sources.

16. The network element of claim 15, wherein the indication is selected from the group consisting of a multicast routing protocol join indication and a multicast routing protocol prune indication.

17. The network element of claim 15, wherein the multicast routing protocol indication is a multicast routing protocol join indication and each of the set of one or more source specific routing protocol messages are each a source specific routing protocol join messages.

18. The network element of claim 15, wherein the multicast routing protocol indication is a multicast routing protocol prune indication and each of the set of one or more source specific routing protocol messages are each a source specific routing protocol prune messages.

19. The network element of claim 15, wherein each of the set of one or more sources provides content for the multicast group.

20. The network element of claim 15, wherein the multicast routing protocol indication is generated in response to a multicast message received from another network element coupled to the receiving network element.

\* \* \* \* \*